Figure 7:
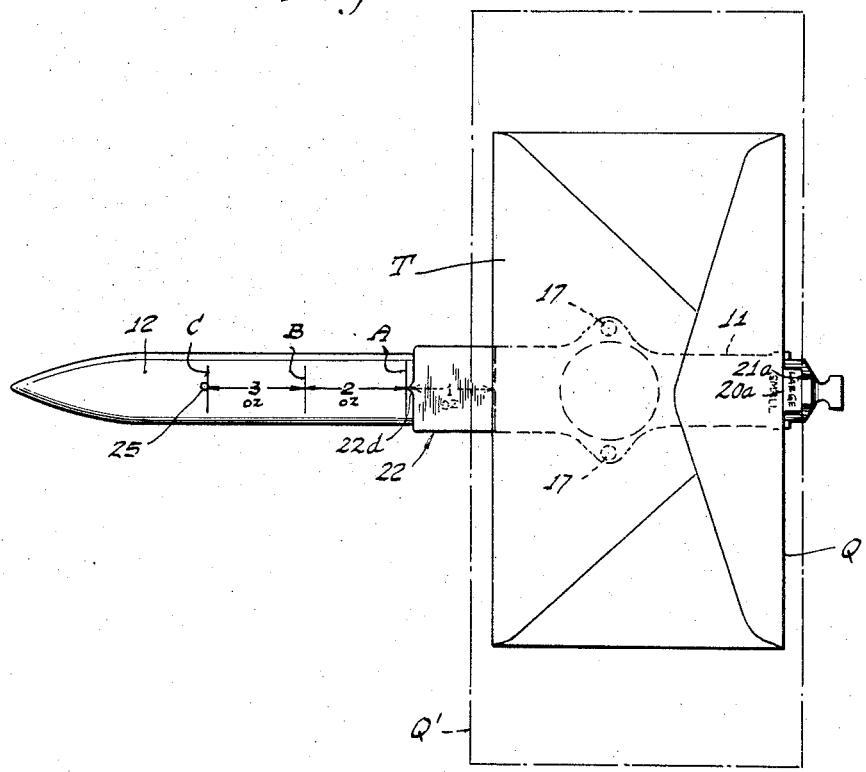

Aug. 16, 1960　　　D. F. LINSLEY　　　2,949,287
POSTAL SCALE
Filed Oct. 29, 1957　　　2 Sheets-Sheet 1
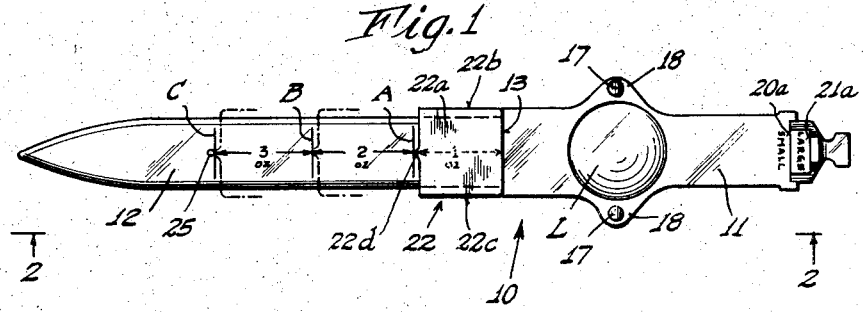
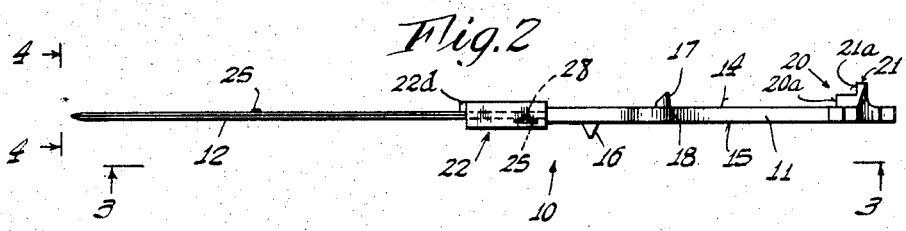
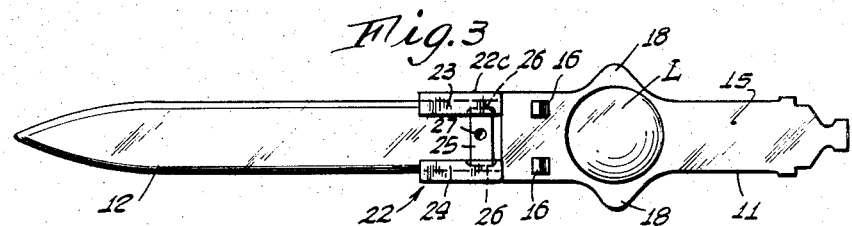
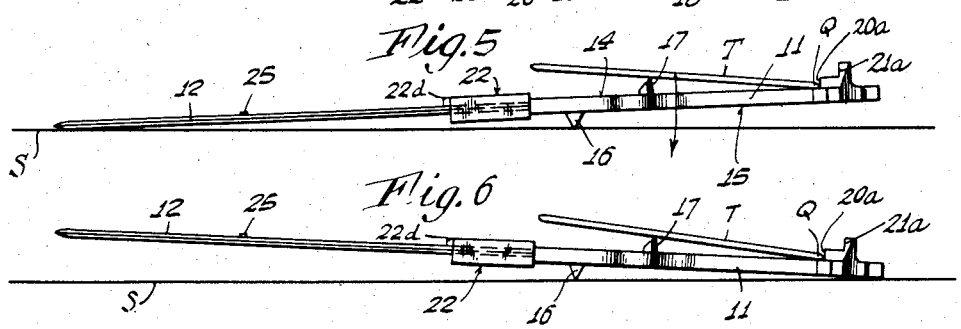
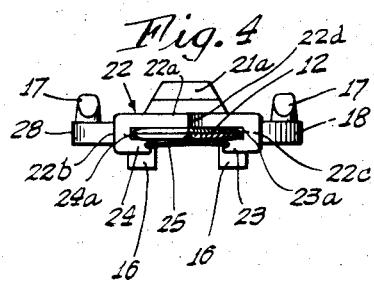
INVENTOR.
Douglas F. Linsley
BY
Johnson and Kline
ATTORNEYS Aug. 16, 1960

D. F. LINSLEY 2,949,287

POSTAL SCALE

Filed Oct. 29, 1957

2 Sheets-Sheet 2

INVENTOR.
Douglas F. Linsley
BY
Johnson and Kline
ATTORNEYS

United States Patent Office 2,949,287
Patented Aug. 16, 1960

2,949,287
POSTAL SCALE
Douglas F. Linsley, 31 Evergreen Ave., Westport, Conn.
Filed Oct. 29, 1957, Ser. No. 693,126
5 Claims. (Cl. 265—49)

This invention relates to weighing scales such as used for determining the postage weight of letters or the like, and more particularly to improvements in a type of scale that operates with a counter-weight rather than with springs.

One of the objects is to provide a letter scale of great simplicity and compactness, adapted for rapid and reliable as well as convenient determination of the postage weight, and which can be set up quickly and conveniently and can be manipulated conveniently at any point of any horizontal supporting surface, and which at the same time is attractive in appearance and handy on a desk and may, when not serving as a postal scale, serve as a paper cutter or letter opener.

A more specific object is to provide a letter scale in the form of a simple fulcrumed balance beam, the function of which is predicated upon having a letter placed atop the beam opposite to the weight carrying arm thereof, thus to avoid the necessity inherent in prior comparable devices of requiring the letter to be attached to a clamping device and thereby to be suspended from the respective arm of the beam.

In the letter scale according to this invention, in order to attain the foregoing objects, abutment means or gauge means are provided upon the letter receiving arm of the balance beam for the purpose of positioning a letter or similar article of predeterminate size flatwise upon the topside of the arm and in special fixed relation to the weight scale markings provided on the opposite arm of the beam along which the counter-weight is positionable. The gauge means or abutments are to insure that the center of gravity of predeterminate or standard letter sizes to be weighed is placed a fixed distance from the fulcrum of the beam, bearing special relation to the weight markings on the weight carrying arm of the beam. With the position of the letter upon the beam predetermined and predicated upon its size, a weight member upon the beam may be positioned for determining the postage weight, with over-balancing of the letter-carrying arm as a criterion.

According to one form of the invention, the balance beam is in the form of a substantially flat and relatively narrow elongate body having prepared edge portions to serve as a letter opener. Transverse fulcrum means are provided at the bottom face of the beam. The handle portion of the letter opener represents the letter receiving arm of the beam, while the blade portion bears the weight scale markings with the weight member positionable therealong for postage weight determinations.

One feature lies in providing upon the end of the handle portion gauge means in the form of one or more reference or bearing portions presenting respective reference faces to be engaged in abutting relationship by the outer transverse edge of respective letter sizes for the purpose of postage weight determinations. The reference faces are so displaced with respect to one another that the centers of gravity of the different letter sizes will coincide.

According to another feature, the movable weight body is in the form of a flat slide member positionable relative to the scale markings, with an end stop at the hilt of the blade defining the inner end position of the weight member equivalent to counter balancing the first unit of letter weight.

Another feature lies in the provision of certain detent means for positioning the slide member upon the blade.

Another feature lies in an organization of parts with a magnifying lens provided in the handle portion and interposed between a pair of projections or prop-up lugs provided one at each side of the handle for supporting the letter at a slope such as to insure abutting contact of the letter edge with the respective reference face of the gauging means and to lift the letter above slide weight.

Further features and advantages will hereinafter appear.
In the drawings:
Figure 1 is a plan view of the weighing scale illustrating the invention as applied to a letter opener.
Fig. 2 is a side view of the device taken on line 2—2 of Fig. 1.
Fig. 3 is a bottom view of the device taken on line 3—3 of Fig. 2.
Fig. 4 is an end view taken on line 4—4 of Fig. 2.
Fig. 5 is a side view similar to Fig. 2 of the device in use illustrating the weight determination of a letter in position weighing less than the minimum unit weight of the scale.
Fig. 6 is a view similar to Fig. 5, illustrating the device in use with a letter in position weighing more than the minimum unit weight of the scale.
Fig. 7 is a plan view of the device illustrating the use of the weighing scale for two different letter sizes of predeterminate dimensions.

In the form of the invention herein shown as exemplary thereof, the weighing scale has as a balance beam a letter opener 10 which comprises a handle portion 11 and a blade portion 12 defined one against the other by a shoulder 13 at the hilt of the blade.

Whereas the balance beam may be made of any suitable material desired, in the preferred form it consists of a plastic material preferably transparent and with all parts integral, including a magnifying lens provided in the handle.

When used as a letter weighing scale the letter opener is placed upon a supporting surface S to rock about its fulcrum 16, and when so viewed the handle portion appears as a flat elongate or oblong body having a top face 14 and also a bottom face 15 which is provided with a fulcrum means here shown in the form of a pair of aligned fulcrum portions 16 spaced a slight distance away from the shoulder 13.

The handle portion has a lens L having its center spaced from the shoulder 13, a distance roughly one third of the length of the handle. The lens may be individually mounted in the handle, but in a preferred form the lens is of plastic material and is formed integrally with the plastic material of the handle.

The lens is flanked by a pair of projections or prop-up members 17 rising from laterial protrusions 18 respectively of the handle portion, the projections 17 aiding in the positioning of a letter to be placed upon the scale.

The outer end of the handle portion is formed at the top face thereof with a pair of stepped-up gauge portions or abutments 20 and 21 presenting vertical reference faces 20a and 21a disposed one above the other and are spaced apart horizontally as well as from the fulcrum edges 16. As will be seen further below, the spacing of these reference faces relative to each other and relative to the fulcrum edge bears special relation to the weight scale marking or marking lines A, B, C on the blade portion 12.

The marking lines A, B, C define three positions of a weight body 22 which is in the form of a slide member of a length which, in the present preferred form, is substantially equal to the spacing of the first marking line A from the shoulder 13. The weight or slide member itself may comprise a flat substantially square body portion 22a and a pair of edge portions 22b and 22c forming a pair of inwardly overhanging flanges 23 and 24 forming grooves 23a and 24a facing each other and slidably engaging respective edges of the blade portion 12. The slide member is thus self-retained upon the blade portion, with an outer stop 25 provided at the last scale marking C defining the outer end position of the slide member.

In the preferred form of the invention the postal weighing scale herein illustrated is used for the determination of postage weights of letters or the like within the one to three ounce range. For example, a letter T of the smaller standard size may be placed upon the handle portion 11 with the outer transverse edge Q of the letter abutting against the reference face 20a and the opposite portion of the letter propped-up by the projections 17 at an angle relative to the top face 14 of the handle.

When the weight 22 is in the inner end position as shown in the drawings, it occupies the one ounce position on the weight scale and in that position furnishes the counter balance equivalent to one ounce of letter weight. The latter in the instance herein illustrated in Fig. 5 is the standard small size envelope to be associated according to this invention with the reference face 20a, and has its center of gravity acting in the direction of arrow effective a predetermined distance from the fulcrum edge. In the specific instance shown, as long as the weight of the letter is one-ounce or less, the balance beam will maintain its tilted position with the handle portion up and not touching the supporting surface S as shown in Fig. 5. But in the instance of the letter weight being greater than one-ounce, the beam will be over-balanced and will tip over to the position shown in Fig. 6. Consequently with the handle portion down, the weight may be shifted outwardly toward the two-ounce position as indicated in dot-and-dash in Fig. 1 for ascertaining whether or not the letter weight comes within the two-ounce range. If it appears that the letter weight falls beyond the two-ounce range, then by shifting the weight toward the three-ounce position it can be ascertained whether or not the weight falls into the three-ounce range.

In order to retain the weight in the one-ounce position at the hilt of the blade when out of use as a postal scale, detent means (see Figs. 3 and 4) are provided. In the preferred form herein shown these detent means comprise a flat spring 25 having its ends sprung into and retained by a pair of recesses 26 provided in the flanges 23 and 24 and bearing a projection 27 engaging in a corresponding recess 28 in the blade portion 12.

In addition, the detent projection 27 which bears on the underside of the blade frictionally holds the slide weight against unintentional movement in any other position to which it may be slid along the blade.

When a letter Q" having a standard large size envelope is to be weighed as indicated by its dot-and-dash outline shown in Fig. 7, the letter is placed upon the scale with its outer transverse edge engaging the reference face 21a of abutment 21, but otherwise the weighing procedure and the manipulation of the weight is the same as described for the letter T having the envelope of the smaller size.

In the form shown in Fig. 1, the weight member 22 is formed integral with an indicator point 22d, the top of which aligns with the marking lines A, B, C in the respective weighing positions of the member.

Variations and modifications may be made within the scope of the claims and portions of the improvements may be used without others.

I claim:
1. A weighing scale for letters or the like comprising a balance beam having a transverse fulcrum means provided at an intermediate point thereof and adapted to rest upon a horizontal supporting surface, the one arm of said beam having weight scale indications, and a weight carried by the beam and positionable therealong relative to said indications, the opposite arm of the beam having gauge means at the top for defining the position of a letter placed flatwise upon said opposite arm with the center of gravity of the letter thereby positioned a predetermined distance from the fulcrum means, said gauge means comprising an abutment formed at the outer end of the arm for engagement with an edge of a letter to be weighed.

2. The weighing scale according to claim 1, wherein the abutment includes a first reference portion facing in the direction of the fulcrum of the beam for cooperation with a first letter size, and a second reference portion disposed above and spaced a distance outwardly in the longitudinal direction of the beam beyond said first reference portion for cooperation with a second letter size, said distance being such that the respective centers of gravity of both letter sizes will substantially coincide when the respective letters engage their respective reference portions.

3. The weighing scale according to claim 1, with stop means defining the inner end position of the weight member spaced from said fulcrum a distance sufficient to provide the counter balance for a letter weight equivalent to the first weight unit of the weight scale markings whereby the balance beam will normally teeter to the side carrying the weight member.

4. The weighing scale according to claim 1, wherein the balance beam is in the form of a flat elongate body with the fulcrum means at the flat underside thereof, wherein the weight body is in the form of a flat slide member having a flat transverse body portion and a pair of edge portions providing a pair of grooves facing inwardly towards each other and cooperative with respective edge portions of the weight carrying arm to slide thereon with end stops defining the end positions in the movement of the slide member upon said arm, and wherein the gauge means comprise an abutment formed at the outer end of the letter-carrying arm and facing in the direction of the fulcrum means.

5. The weighing scale according to claim 1, wherein the balance beam is in the form of a flat elongate body with a fulcrum edge at the flat underside thereof, wherein the gauge means comprise an abutment formed at the outer end of the letter-carrying arm and facing in the direction of the fulcrum edge, and wherein said letter-carrying arm is formed with a pair of substantially symmetrical lateral protrusions each carrying a substantially identical upward projection serving as a prop-up means for supporting a letter at a downward slope toward said reference portion to insure abutting relationship therewith.

References Cited in the file of this patent

UNITED STATES PATENTS

| | | |
|---|---|---|
| 227,050 | Palmer | Mar. 27, 1880 |
| 667,526 | Manes | July 2, 1901 |
| 1,045,425 | Millward | Nov. 26, 1912 |
| 1,211,057 | Berzon | Jan. 2, 1917 |
| 1,843,934 | Stephens | Feb. 9, 1932 |
| 2,502,680 | Stewart | Apr. 4, 1950 |